(12) United States Patent
Shebanow et al.

(10) Patent No.: US 7,512,773 B1
(45) Date of Patent: Mar. 31, 2009

(54) CONTEXT SWITCHING USING HALT SEQUENCING PROTOCOL

(75) Inventors: Michael C. Shebanow, Saratoga, CA (US); Robert C. Keller, Palo Alto, CA (US); Richard A. Silkebakken, Santa Clara, CA (US); Benjamin J. Garlick, Sunnyvale, CA (US)

(73) Assignee: NVIDIA Corporation, Santa Clara, CA (US)

( * ) Notice: Subject to any disclaimer, the term of this patent is extended or adjusted under 35 U.S.C. 154(b) by 250 days.

(21) Appl. No.: 11/252,855

(22) Filed: Oct. 18, 2005

(51) Int. Cl.
*G06F 9/46* (2006.01)

(52) U.S. Cl. ...................... 712/228; 718/108
(58) Field of Classification Search ............... 712/228; 718/108
See application file for complete search history.

(56) References Cited

U.S. PATENT DOCUMENTS

| | | | | |
|---|---|---|---|---|
| 5,150,469 A | * | 9/1992 | Jouppi | 712/244 |
| 5,752,031 A | * | 5/1998 | Cutler et al. | 718/103 |
| 5,872,962 A | * | 2/1999 | Hisanaga et al. | 712/230 |
| 5,933,627 A | * | 8/1999 | Parady | 712/228 |
| 6,018,759 A | * | 1/2000 | Doing et al. | 718/108 |
| 6,223,208 B1 | * | 4/2001 | Kiefer et al. | 718/108 |
| 6,401,155 B1 | * | 6/2002 | Saville et al. | 710/266 |
| 6,762,764 B2 | | 7/2004 | Hiwada et al. | |
| 6,801,202 B2 | | 10/2004 | Nelson et al. | |
| 7,127,723 B2 | * | 10/2006 | Endo et al. | 719/319 |
| 2003/0169259 A1 | | 9/2003 | Lavelle et al. | |
| 2004/0008200 A1 | | 1/2004 | Naegle et al. | |
| 2007/0043916 A1 | * | 2/2007 | Aguilar et al. | 711/150 |

* cited by examiner

*Primary Examiner*—David J Huisman
(74) *Attorney, Agent, or Firm*—Patterson & Sheridan, LLP

(57) ABSTRACT

A halt sequencing protocol permits a context switch to occur in a processing pipeline even before all units of the processing pipeline are idle. The context switch method based on the halt sequencing protocol includes the steps of issuing a halt request signal to the units of a processing pipeline, monitoring the status of each of the units, and freezing the states of all of the units when they are either idle or halted. Then, the states of the units, which pertain to the thread that has been halted, are dumped into memory, and the units are restored with states corresponding to a different thread that is to be executed after the context switch.

12 Claims, 5 Drawing Sheets

PRIOR ART

PRIOR ART

CONTEXT SWITCHING USING HALT SEQUENCING PROTOCOL

BACKGROUND OF THE INVENTION

1. Field of the Invention

Embodiments of the present invention relate generally to context switching and, more particularly, to context switching that employs a halt sequencing protocol.

2. Description of the Related Art

A context switch is a feature of a multitasking operating system that allows for a switch in execution from one computing thread or process to another. This feature ensures that a processor cannot be monopolized by any one processor-intensive thread or process. During a context switch, the states of the processor of the currently running process are stored in memory and the processor is restored with states of another process that was previously stored in memory.

In graphics applications, a number of threads may be multiprocessed through a graphics pipeline that is managed by a graphics processing unit (GPU). A simplified diagram of a graphics pipeline 100 is illustrated in FIG. 1. The graphics pipeline 100, as shown, includes a front end (FE) 110, a number of processing units 120, and a raster operations unit 130. Part of the FE 110 is a unit of the graphics pipeline 100. This part decodes the commands that are to be processed by the other units of the graphics pipeline 100. Additional details of a graphics pipeline and the functions of each of the units of the graphics pipeline are described in U.S. patent application Ser. No. 11/009,471, filed Dec. 10, 2004, entitled "Fragment Processor Having Dual Mode Register File," the entire contents of which are incorporated by reference herein.

The input to the graphics pipeline 100 is a host unit 105. The host unit 105 schedules the processing of different threads through the graphics pipeline 100. The output of the graphics pipeline 100 is a frame buffer 135, which stores the data of the image to be displayed. A memory unit 140 for storing different contexts of the graphics pipeline 100 is also provided. During a context switch, the FE 110 stores the current context (states) of the graphics pipeline 100 in the memory unit and restores the graphics pipeline 100 to a context that has been previously stored in the memory unit 140.

A context switch does not occur immediately upon a command from the host unit 105. When the FE 110 receives a context switch command from the host unit 105, it suspends sending commands down the graphics pipeline 100 and then waits for an idle status signal from each of the units of the graphics pipeline 100. A context switch occurs only after the FE 110 receives an idle status signal from each of the units of the graphics pipeline 100. This ensures that the graphics pipeline 100 is completely drained before the context switch.

The context switch protocol described above is known as the wait-for-idle (WFI) protocol. The architecture that implements the WFI protocol is illustrated in FIG. 2. In FIG. 2, separate connections from each unit of the graphics pipeline 100 to the FE 110 are collectively represented by the reference numeral 210 and shown superimposed on the graphics pipeline 100 illustrated in FIG. 1. At each clock, each unit of the graphics pipeline 100 reports back its status (idle or non-idle) to the FE 110. A context switch occurs when the FE 110 receives a context switch command from the host unit 105 and all of the units of the graphics pipeline 100 are reporting that they are idle. During a context switch, the FE 110 dumps the state information of each unit of the graphics pipeline 100 into the memory unit 140, and restores the units of the graphics pipeline 100 with state information retrieved from the memory unit 140 that corresponds to a thread that is scheduled to be processed by the graphics pipeline 100 after the context switch.

SUMMARY OF THE INVENTION

The present invention provides a context switch method that uses a protocol, referred to as a halt sequencing protocol, which permits a context switch to occur even before all units of a processing pipeline are idle. As a result, context switches made in accordance with embodiments of the present invention occur earlier relative to context switches made in accordance with methods that are based on the WFI protocol, and a more precise scheduling of multithread processing can be achieved. Furthermore, the halt sequencing protocol of the present invention enables dynamic page memory management by allowing a pipeline unit to go into a halted state if a page fault is generated in response to a memory access and then performing a context switch. This is a functionality that cannot be achieved with the WFI protocol, because a context switch based on the WFI protocol requires that all pipeline units be idle at the time of the context switch and a pipeline unit that causes a page fault cannot go idle.

The context switch method according to an embodiment of the present invention includes the steps of issuing a halt request signal to the units of a processing pipeline, monitoring the status of each of the units, and freezing the states of all of the units when they are either idle or halted. Then, the states of the units, which pertain to the thread that has been halted, are dumped into memory, and the units are restored with states corresponding to a different thread that is to be executed after the context switch.

The present invention also provides a processing pipeline in which the halt sequencing protocol can be applied. According to an embodiment of the present invention, the processing pipeline is connected to a front end unit and includes a plurality of pipeline units, each of which is connected to the front end unit through three separate connections. The halt request signal is transmitted to the pipeline units through a first one of the three connections. The status signals of the pipeline units are transmitted to the front end unit through a second one of the three connections. The signal to freeze the states of all of the pipeline units is transmitted to the pipeline units through a third one of the three connections. In response to this freeze signal, the state information of each of the pipeline units is stored in memory and the state information corresponding to a different thread, which is to be executed after the context switch, is retrieved from memory, and the pipeline units are restored with the retrieved states.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
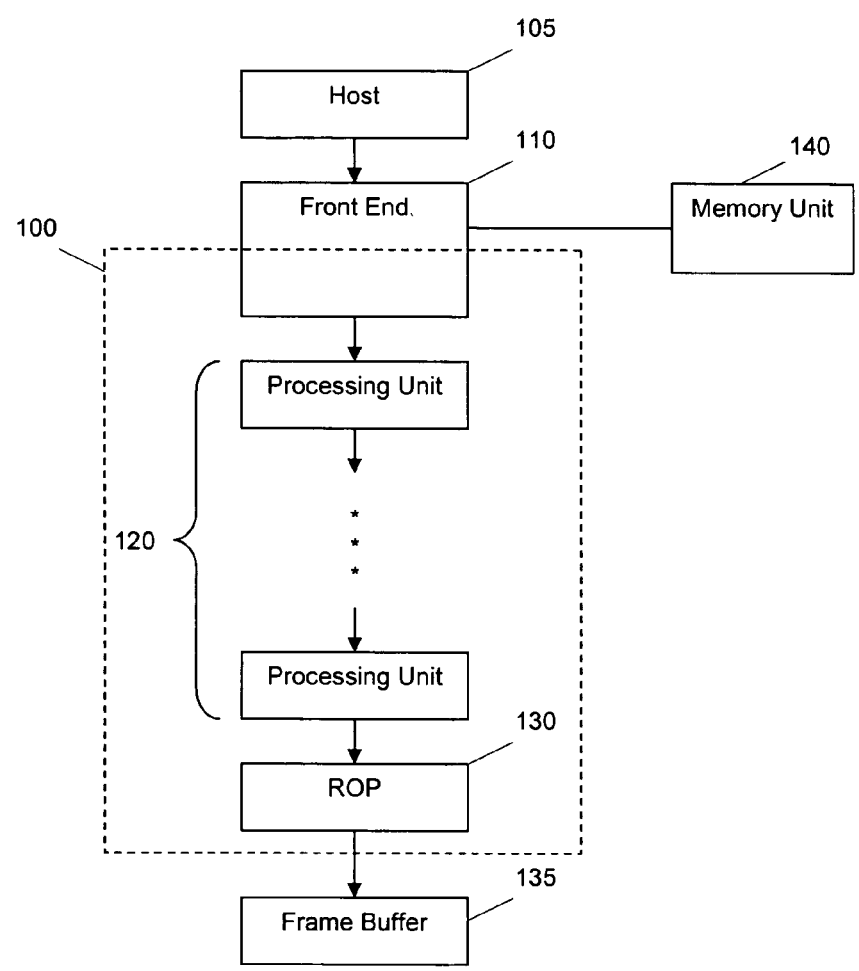
FIG. 1 is a simplified block diagram of a graphics pipeline of a GPU.
Figure 2:
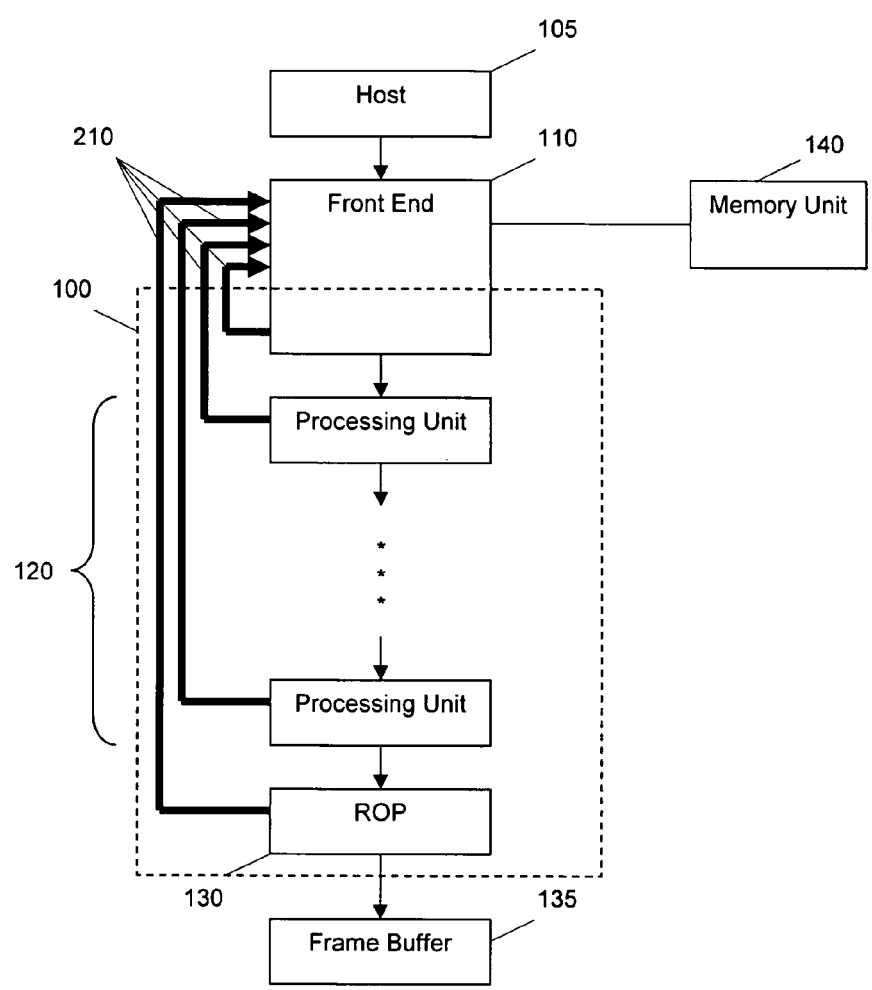
FIG. 2 shows connections in the graphics pipeline of FIG. 1 that enable context switching based on the WFI protocol.
Figure 3:
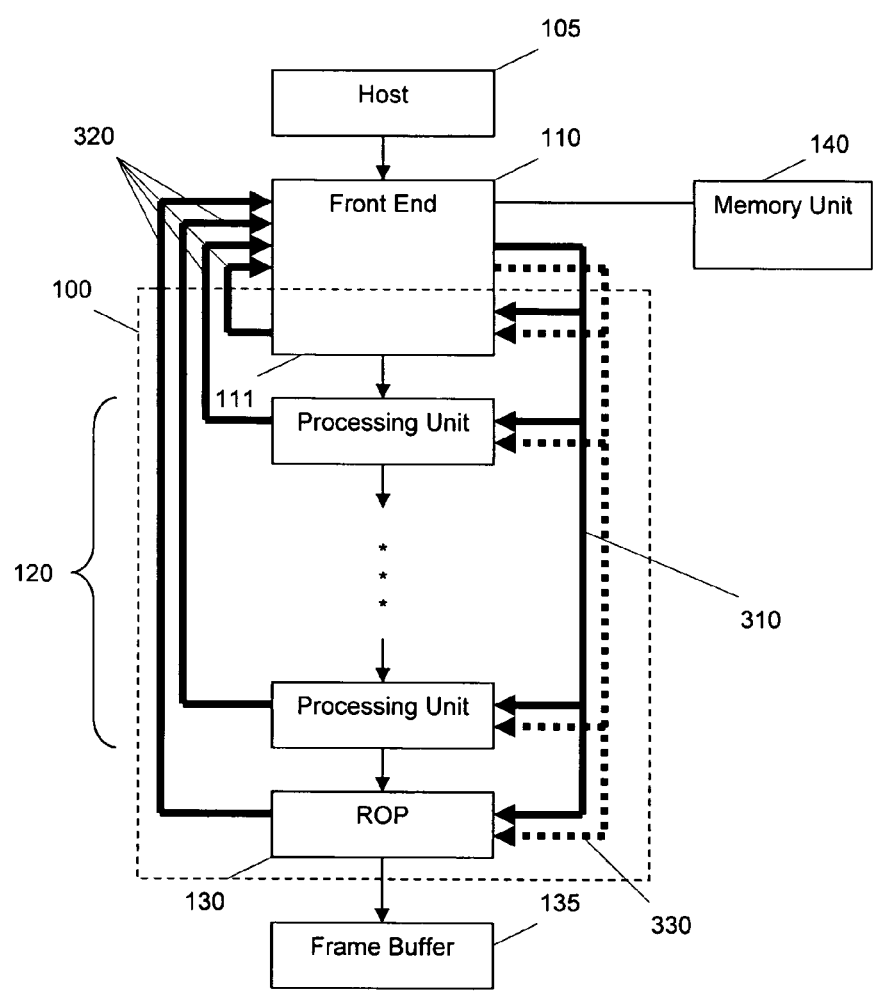
FIG. 3 shows connections in the graphics pipeline of FIG. 1 that enable context switching according to an embodiment of the present invention.

FIG. 3 shows connections in the graphics pipeline of FIG. 1 that enable context switching according to an embodiment of the present invention. The host unit 105 schedules the multiple threads to be executed through the graphics pipeline 100. The FE 110 receives a context switch command from the host unit 105 and initiates the halt sequence in accordance with the halt sequencing protocol. Initially, the FE 110 broadcasts a request_to_halt signal to all of the units in the graphics pipeline 100 through a first connection 310. A request_to_halt signal can be broadcast by generating an active signal and propagating it through the first connection 310.

The units in the graphics pipeline 100 include the FE decode section 111, the plurality of processing units 120, and the raster operations unit 130, and are hereinafter referred to individually as a pipeline unit and collectively as pipeline units. Each pipeline unit is timed using the clock of the GPU, and typically comprise various sub-units (e.g., FIFO buffers, latches, etc.). The state information of a pipeline unit includes the states of its sub-units.

In response to the request_to_halt signal, each pipeline unit reports its status to the FE 110 through a second connection 320 via a status signal that indicates that the unit is idle or halted, or neither. The status signal is generated by each pipeline unit at every clock cycle. The FE 110 monitors the status signals and when it determines that all of the pipeline units are either idle or halted, it broadcasts a stay_halted signal to them through a third connection 330. A stay_halted signal can be broadcast by generating an active signal and propagating it through the third connection 330. The stay_halted signal freezes the states of the pipeline units. Thereafter, the FE 110 performs the context switch, during which the states of the pipeline units are stored in the memory 140, and the states of another process are retrieved from the memory 140 and the pipeline units are restored to the retrieved states. In general, the storing and restoring of the states of the pipeline units are performed through the FE 110, but it is possible for these steps to be carried out directly by the pipeline units themselves.

The first and third connections 310, 330 preferably have a pipelined distribution tree configuration that includes a number of amplifying stages between the FE 110 and each of the pipeline units. The number of amplifying stages is typically 3 or 4. Larger chip areas would require a larger number of amplifying stages.

The second connection 320 comprises a multiple number of separate physical connections between the FE 110 and the pipeline units. Each separate physical connection may be implemented as one or more wires, in sufficient number to encode the status of the pipeline unit as idle, halted, or neither. In a single wire implementation, an active signal indicates either an idle status or a halted status, and a non-active signal indicates neither status. Multiple wire implementations allow for separate encoding of the idle status and the halted status. Also, in the preferred embodiment, some pipeline units roll up or merge its status with the status of one or more other pipeline units and some do not. This can be done in the single wire implementation, for example, by performing an AND operation on the incoming status signal with its status signal, and transmitting the signal resulting from the AND operation. As a result, the number of separate connections between the FE 110 and the pipeline units is typically, although it does not have to be, greater than 1 and less than N, where N is the number of pipeline units.

Although a graphics pipeline is illustrated in FIG. 3, the present invention is applicable to other types of pipelines that perform multiprocessing. For example, the present invention is applicable to a pipeline of a central processing unit (CPU) of a computing device that performs multiprocessing.

Figure 4:
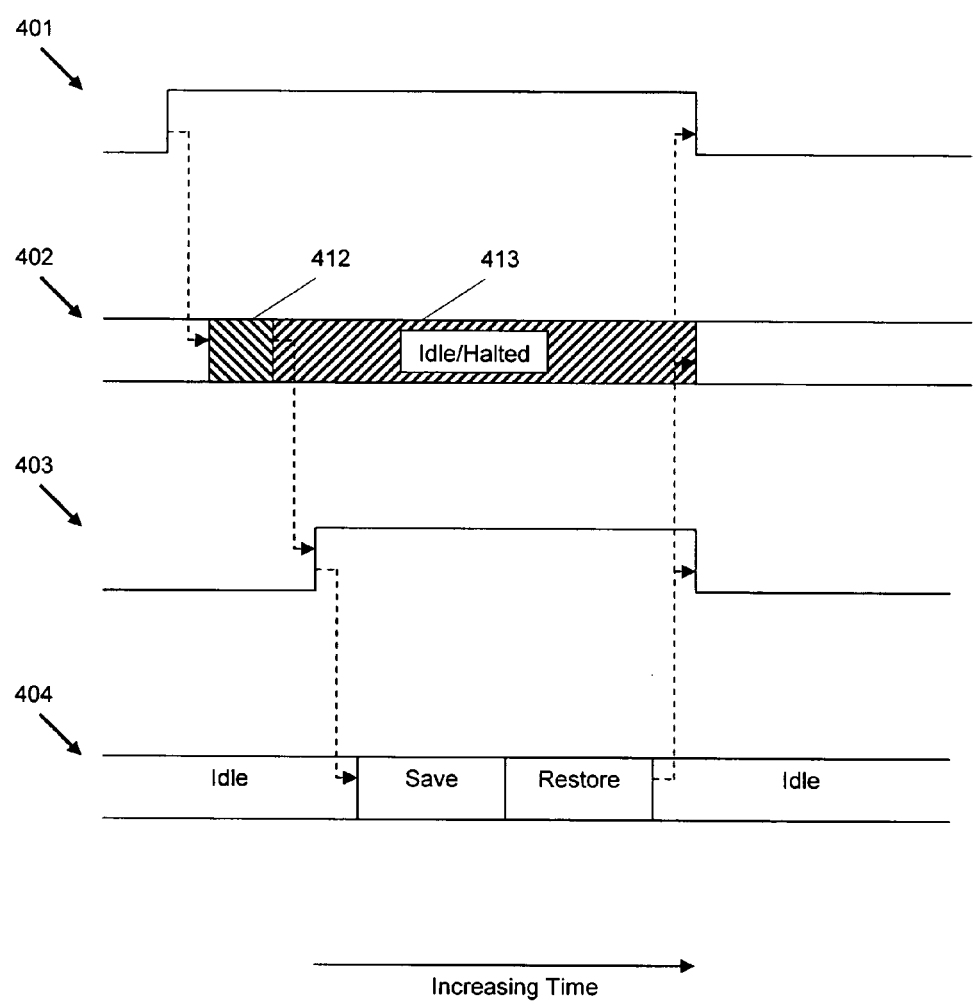
FIG. 4 is a diagram that illustrates the relative timing of various signals that enable context switching according to an embodiment of the present invention.

FIG. 4 is a diagram that illustrates the relative timing of various signals that enable context switching according to embodiments of the present invention. The signals illustrated in FIG. 4 include a first signal 401 transmitted through the first connection 310, a group of second signals 402 transmitted through the second connection 320, and a third signal 403 transmitted through the third connection 330. A timing diagram 404 of the context switch performed by the FE 110 is also shown in FIG. 4 to illustrate the timing of the context switch, in particular the timing of the storing and restoring of the states of the pipeline units, relative to the signals 401, 402, 403.

When the FE 110 receives a context switch command from the host unit 105, it initiates the halt sequence in accordance with the halt sequencing protocol by broadcasting a request_to_halt signal 401 to all of the pipeline units through the first connection 310. A request_to_halt signal is broadcast to the pipeline units through the first connection 310 when the first signal 401 goes active. In response to the request_to_halt signal, each pipeline unit begins reporting its status to the FE 110 through the second connection 320 via a status signal that indicates that it is idle or halted, or neither. The time interval of the status signal group 402 indicated by the reference numeral 412 represents a transition period during which some, but not all, of the pipeline units are idle or halted. The time interval of the status signal group 402 indicated by the reference numeral 413 represents the period during which all of the pipeline units are either idle or halted. When the FE 110 determines that all of the pipeline units are either idle or halted, it broadcasts a stay_halted signal to them through the third connection 330. A stay_halted signal is broadcast to the pipeline units through the third connection 330 when the third signal 401 goes active. The stay_halted signal freezes the states of the pipeline units. After the stay_halted signal has been issued, the FE 110 performs the context switch. First, the states of the pipeline units are stored in the memory 140. Second, the states of another process are retrieved from the memory 140 and the pipeline units are restored to the retrieved states. After the pipeline units are restored to the retrieved states, the first signal 401 and the third signal 403 are made inactive. Also, the pipeline units cease with their status reporting.

Figure 5:
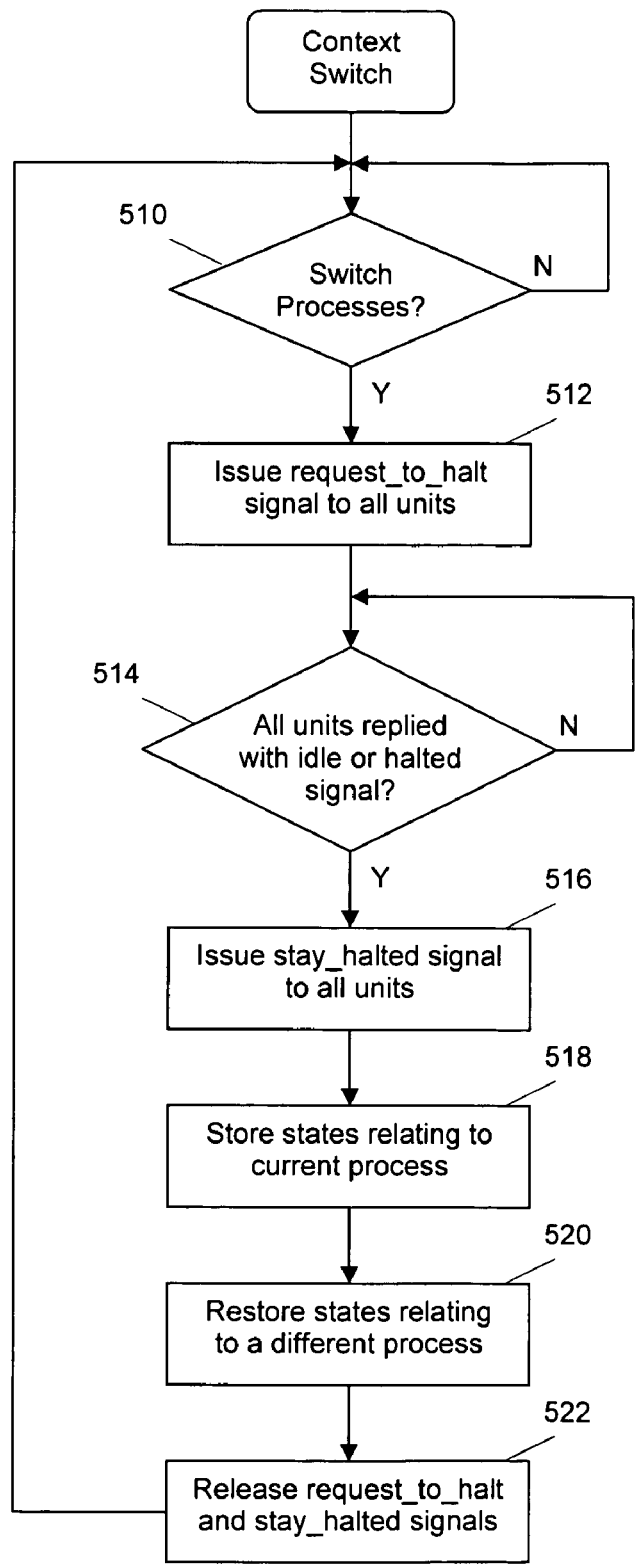
FIG. 5 is a flow diagram of steps that are carried out in the context switching method according to an embodiment of the present invention.

FIG. 5 is a flow diagram of steps that are carried out in the context switching method according to an embodiment of the present invention. The kernel level software of the GPU may be modified to implement this method. Alternatively, the hardware components of the GPU may be modified to implement this method.

In step 510, the FE 110 monitors to see if it has received a command from the host unit 105 to switch processes, i.e., to switch context. If so, the FE 110 causes the first signal 401 to go active and issues the request_to_halt signal to all of the pipeline units through the first connection 310 (step 512). Thereafter, the FE 110 monitors a collective status signal that represents the group of second signals 402 issued by the pipeline units through the second connection 320, and checks to see if all pipeline units are in the idle state or the halted state (step 514). If they are, the flow proceeds to step 516 at which the FE 110 causes the third signal 403 to go active and issues the stay_halted signal to all of the pipeline units through the third connection 320. Then, in step 518, the states pertaining to the current process being executed through the pipeline are stored in the memory 140. In step 520, the states pertaining to a different process to be executed after the context switch are read from the memory 140 and the pipeline units are restored with the states read from the memory 140. After the context switch has occurred, the first signal 401 and the third signal 403 are returned to their normal, non-active levels (step 522). The flow the returns to step 510, at which the FE 110 waits for another context switch command from the host unit 105.

While the foregoing is directed to embodiments of the present invention, other and further embodiments of the invention may be devised without departing from the basic scope thereof. The scope of the present invention is determined by the claims that follow.

What is claimed is:

1. A context switching method for a processing pipeline, comprising the steps of:
    issuing a request-to-halt signal to a plurality of pipeline processing units in the processing pipeline, wherein each of the pipeline processing units is serially connected to another pipeline processing unit or to a frame buffer and is configured to process graphics data;
    receiving a plurality of status signals from the pipeline processing units in response to the request-to-halt signal, wherein a first status signal includes a not-idle signal indicating that a first pipeline processing unit is currently executing instructions, a second status signal includes an idle signal indicating that a second pipeline processing unit has completed executing all current instructions, and a third status signal includes a halted signal indicating that a third pipeline processing unit has not completed executing all instructions currently being executed by the third pipeline processing unit and has halted execution of the instructions currently being executed;
    once the first pipeline processing unit is also either idle or halted, issuing a stay-halted signal to the first, second, and third pipeline processing units to stay idle or halted based on the plurality of status signals;
    storing states of the pipeline processing units; and
    restoring previously stored states of the pipeline processing units.

2. The context switching method according to claim 1, further comprising the step of canceling the stay-halted signal after the step of restoring.

3. The context switching method according to claim 1, wherein one of the status signals indicates an aggregate status of at least two pipeline processing units.

4. The context switching method according to claim 1, wherein the steps are carried out with reference to a common clock, and wherein the plurality of status signals are received at each clock cycle after the issuance of the request-to-halt signal at least until the stay-halted signal is issued.

5. The context switching method according to claim 1, wherein the states of the pipeline processing units that are stored pertain to a first process and the states of the pipeline processing units that have been previously stored pertain to a second process.

6. The context switching method according to claim 5, wherein the request-to-halt signal is issued in response to an instruction to switch from processing the first process in the processing pipeline to processing the second process in the processing pipeline.

7. The context switching method according to claim 6, wherein the first process and the second process comprise graphics processes and the processing pipeline comprises a graphics processing pipeline resident on a graphics processor.

8. The context switching method according to claim 1, further comprising enabling dynamic page memory management by allowing the pipeline processing units to go into a halted state if a page fault is generated in response to a memory access.

9. A processing pipeline connected to a front end unit, comprising:
    a plurality of pipeline processing units, each of which is coupled to the front end unit through first, second and third connections, the first connection being configured to convey a request-to-halt signal from the front end unit to the pipeline processing units, the second connection being configured to convey a status signal to the front end unit, and a third connection being configured to convey a stay-halted signal from the front end unit to the pipeline processing units,
    wherein each pipeline processing unit is configured to issue the status signal while the request-to-halt signal is active and to dump its states into memory and read new states from memory while the stay-halted signal is active,
    wherein each of the pipeline processing units is serially connected to another pipeline processing unit or to a frame buffer and is configured to process graphics data,
    wherein a first status signal includes a not-idle signal indicating that a first pipeline processing unit is currently executing instructions, a second status signal includes an idle signal indicating that a second pipeline processing unit has completed executing all current instructions, and a third status signal includes a halted signal indicating that a third pipeline processing unit has not completed executing all instructions currently being executed by the third pipeline processing unit and has halted execution of the instructions currently being executed; and
    wherein the stay-halted signal is issued once the first pipeline processing unit is also either idle or halted.

10. The processing pipeline according to claim 9, wherein the front end unit is configured to issue the stay-halted signal based on one or more of the status signals received from the pipeline processing units.

11. The processing pipeline according to claim 9, wherein the processing pipeline comprises a graphics processing pipeline resident on a graphics processor.

12. The processing pipeline according to claim 9, further configured to enable dynamic page memory management by allowing the pipeline processing units to go into a halted state if a page fault is generated in response to a memory access.

* * * * *